United States Patent
Bitan et al.

(10) Patent No.: US 10,760,301 B2
(45) Date of Patent: Sep. 1, 2020

(54) APPARATUS FOR AVOIDING ABANDONING AN INFANT IN A VEHICLE

(71) Applicants: Yacov Bitan, Kiryat Shmuel (IL); Amos Bitan, Kiryat Motzkin (IL); Uri Bitan, Moshav Achihud (IL)

(72) Inventors: Yacov Bitan, Kiryat Shmuel (IL); Amos Bitan, Kiryat Motzkin (IL); Uri Bitan, Moshav Achihud (IL)

(*) Notice: Subject to any disclaimer, the term of this patent is extended or adjusted under 35 U.S.C. 154(b) by 98 days.

(21) Appl. No.: 16/142,018

(22) Filed: Sep. 26, 2018

(65) Prior Publication Data

US 2019/0100938 A1   Apr. 4, 2019

(30) Foreign Application Priority Data

Oct. 1, 2017  (IL) .......................................... 254830

(51) Int. Cl.
    *E05B 11/00* (2006.01)
    *B60N 2/00* (2006.01)
    *B60N 2/28* (2006.01)

(52) U.S. Cl.
    CPC ............ *E05B 11/005* (2013.01); *B60N 2/002* (2013.01); *B60N 2/28* (2013.01); *E05Y 2900/50* (2013.01)

(58) Field of Classification Search
    CPC .... E05B 11/00; E05B 11/005; E05Y 2900/50; B60N 2/002; B60N 2/28
    USPC ................................... 340/5.31; 70/389, 429
    See application file for complete search history.

(56) References Cited

U.S. PATENT DOCUMENTS

| | | | | | |
|---|---|---|---|---|---|
| 1,602,123 | A | * | 10/1926 | Rietzler | ............... E05B 11/005 70/430 |
| 3,874,204 | A | * | 4/1975 | Capri | ..................... E05B 17/142 70/427 |
| 4,332,306 | A | * | 6/1982 | Turatti | .............. B60R 25/02142 180/287 |
| 4,789,859 | A | * | 12/1988 | Clarkson | ............... E05B 47/063 340/5.65 |
| 4,837,567 | A | * | 6/1989 | Kleefeldt | .......... B60R 25/02115 307/10.5 |
| 5,671,624 | A | * | 9/1997 | Sivils | ...................... E05B 19/00 16/110.1 |
| 8,892,302 | B1 | * | 11/2014 | McDonald | ............. G08B 21/24 701/36 |
| 2003/0115917 | A1 | * | 6/2003 | Rudolph | ............... B60R 16/027 70/252 |
| 2009/0027188 | A1 | * | 1/2009 | Saban | ..................... B60N 2/002 340/521 |
| 2011/0000267 | A1 | * | 1/2011 | Domit | ................... E05B 11/005 70/389 |

* cited by examiner

*Primary Examiner* — Edwin C Holloway, III
(74) *Attorney, Agent, or Firm* — Alphapatent Associates, Ltd; Daniel J. Swirsky (57) ABSTRACT

An apparatus for avoiding abandoning an infant in a vehicle, the apparatus including: a mechanism, for providing a first state of avoiding removal of the key from a vehicle's lock, and a second state of allowing removal of the key; and a control, for controlling the mechanism to one of the states of the mechanism as a function of presence of an infant in the vehicle, thereby avoiding the key's removal as a function of the presence of the infant.

10 Claims, 12 Drawing Sheets

APPARATUS FOR AVOIDING ABANDONING AN INFANT IN A VEHICLE

CROSS-REFERENCE TO RELATED APPLICATIONS

This application claims the benefit of priority from IL Patent Application No. 254,830, filed Oct. 1, 2017, the disclosure of which is incorporated herein by reference.

TECHNICAL FIELD

The invention relates to the field of accessories for avoiding abandoning infants in a vehicle.

BACKGROUND

There is a long felt need to provide an improvement in accessories for avoiding abandoning infants in a vehicle.

SUMMARY

An apparatus for avoiding abandoning an infant, including: a protrusion, for being attached to a blade of a key; a bolt assembly; and a control, for controlling the slideable bolt as a function of presence of an infant in the vehicle.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
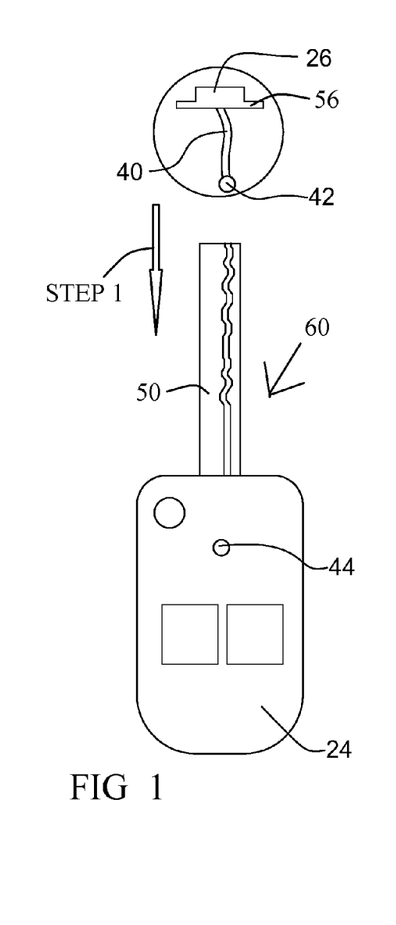
FIG. 1 is a front view of a prior art key, and of a key sleeve, being one part of the apparatus according to one embodiment of the invention, at the first step.

FIG. 1 is a front view of a prior art key, and of a key sleeve, being one part of the apparatus according to one embodiment of the invention, at the first step.

Figure 2:
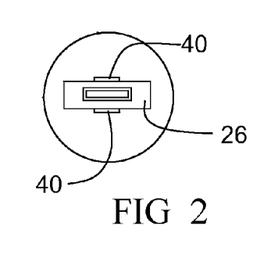
FIG. 2 is a top view of the key sleeve of FIG. 1.

FIG. 2 is a top view of the key sleeve of FIG. 1.

At the first step, the user slides a sleeve 26 onto the blade 50 of the prior art key 24 of the vehicle.

Figure 3:
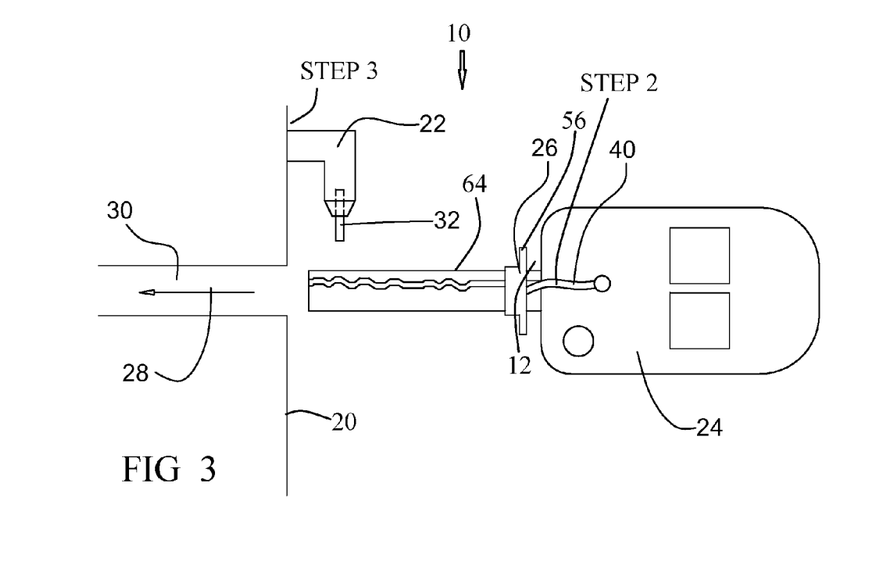
FIG. 3 depicts the second and third steps of using the apparatus of FIG. 1.

FIG. 3 depicts the second and third steps of using the apparatus of FIG. 1.

At the second step, the user locks sleeve 26 to the handle 24 of the key, by a strip 40 ending with a fastening element 40.

The apparatus 10 further includes a bolt assembly 22.

At the third step, the user fixes bolt assembly 22 to the dashboard 20 of the vehicle.

Figure 4:
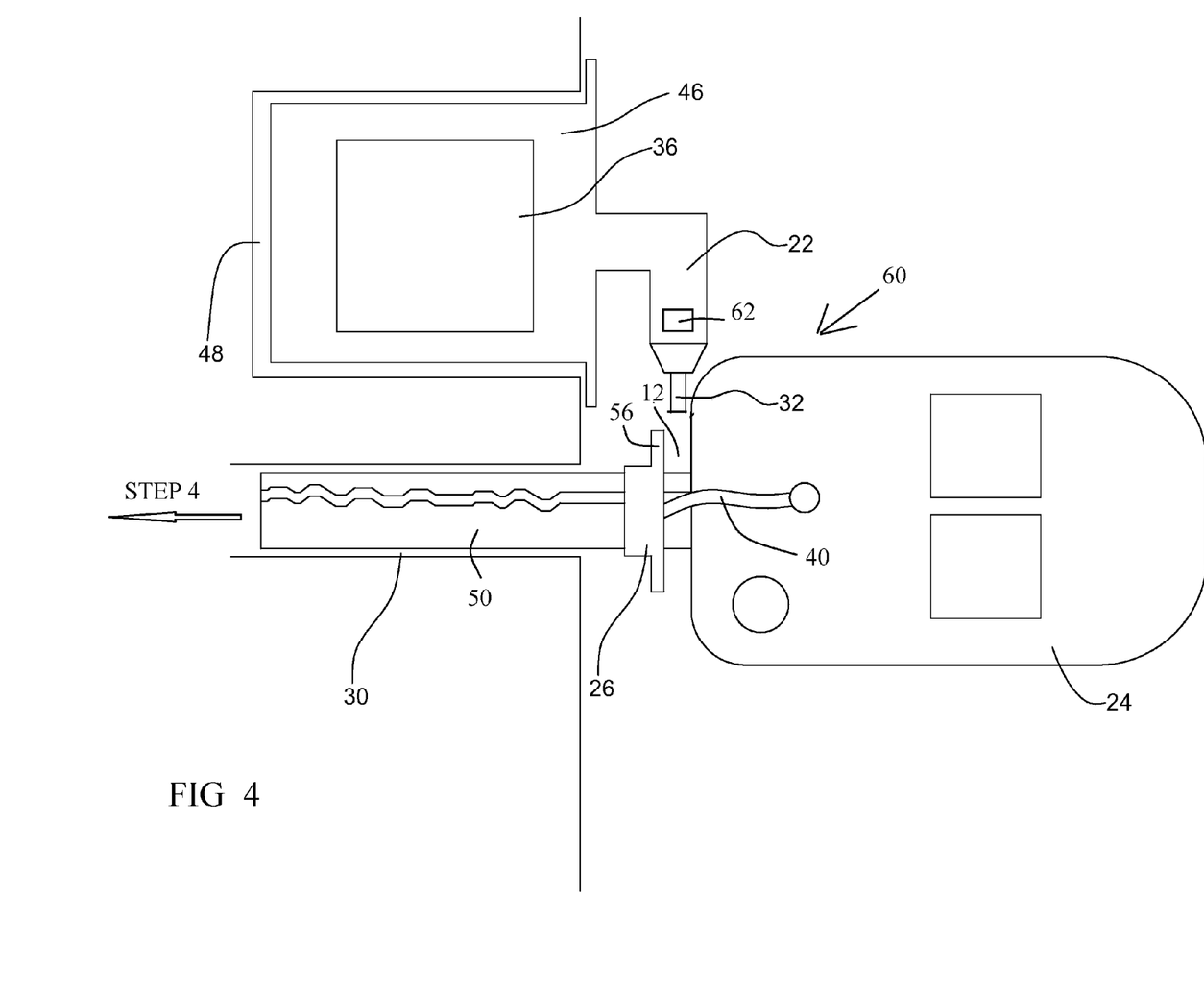
FIG. 4 depicts the apparatus of FIG. 3, at the fourth step.

FIG. 4 depicts the apparatus of FIG. 3, at the fourth step.

At the fourth step, the user inserts blade 50 of the key into the key socket.

Figure 5:
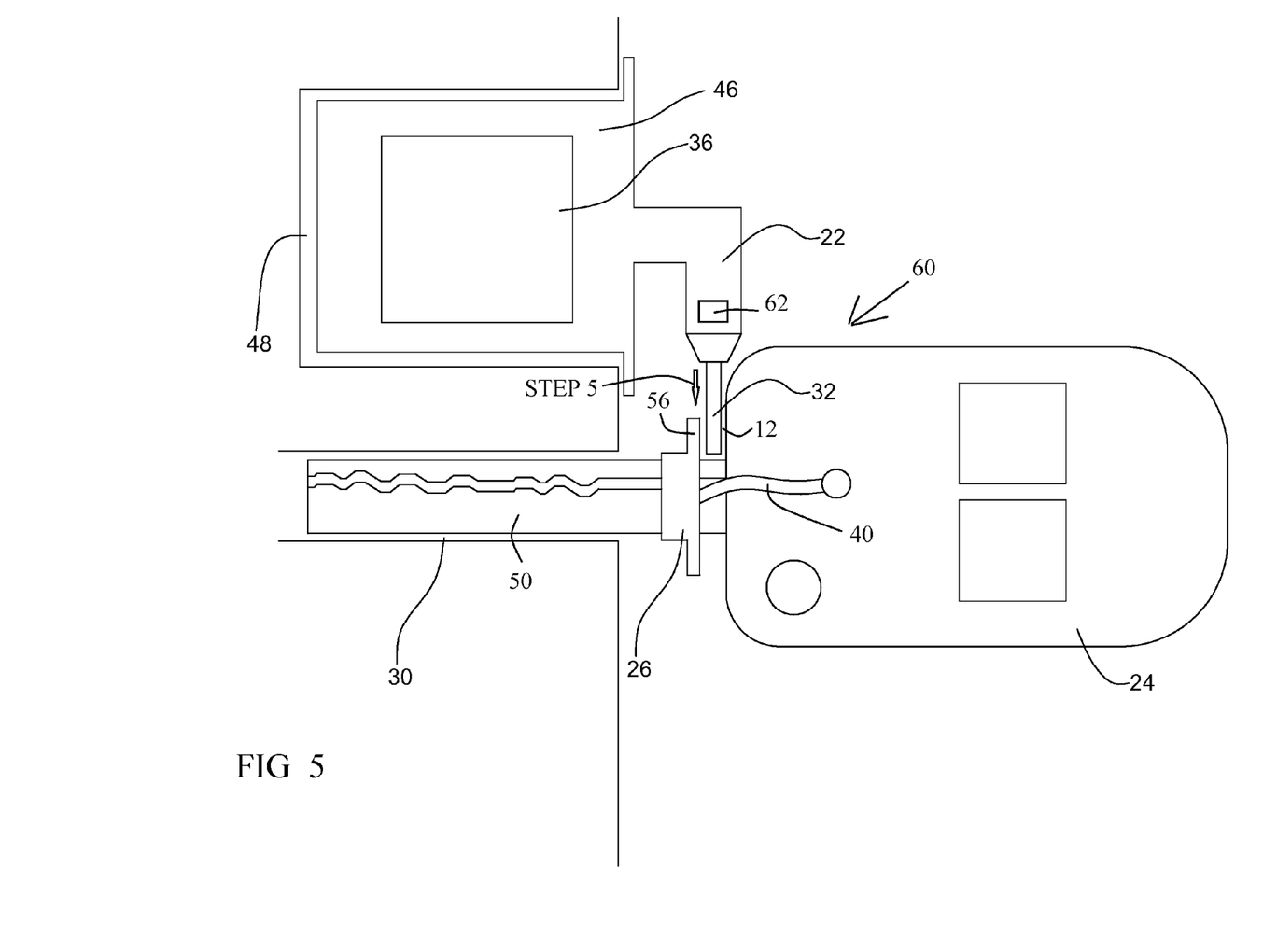
FIG. 5 depicts the apparatus of FIG. 3, at the fifth step.

FIG. 5 depicts the apparatus of FIG. 3, at the fifth step.

At the fifth step, bolt assembly 22 slides bolt 32. Consequently, the end of bolt 32 inserts a gap 12, disposed between a protrusion 56 of sleeve 26 and handle 24 of the key 60, thus not allowing removal of key 60.

Figure 6:
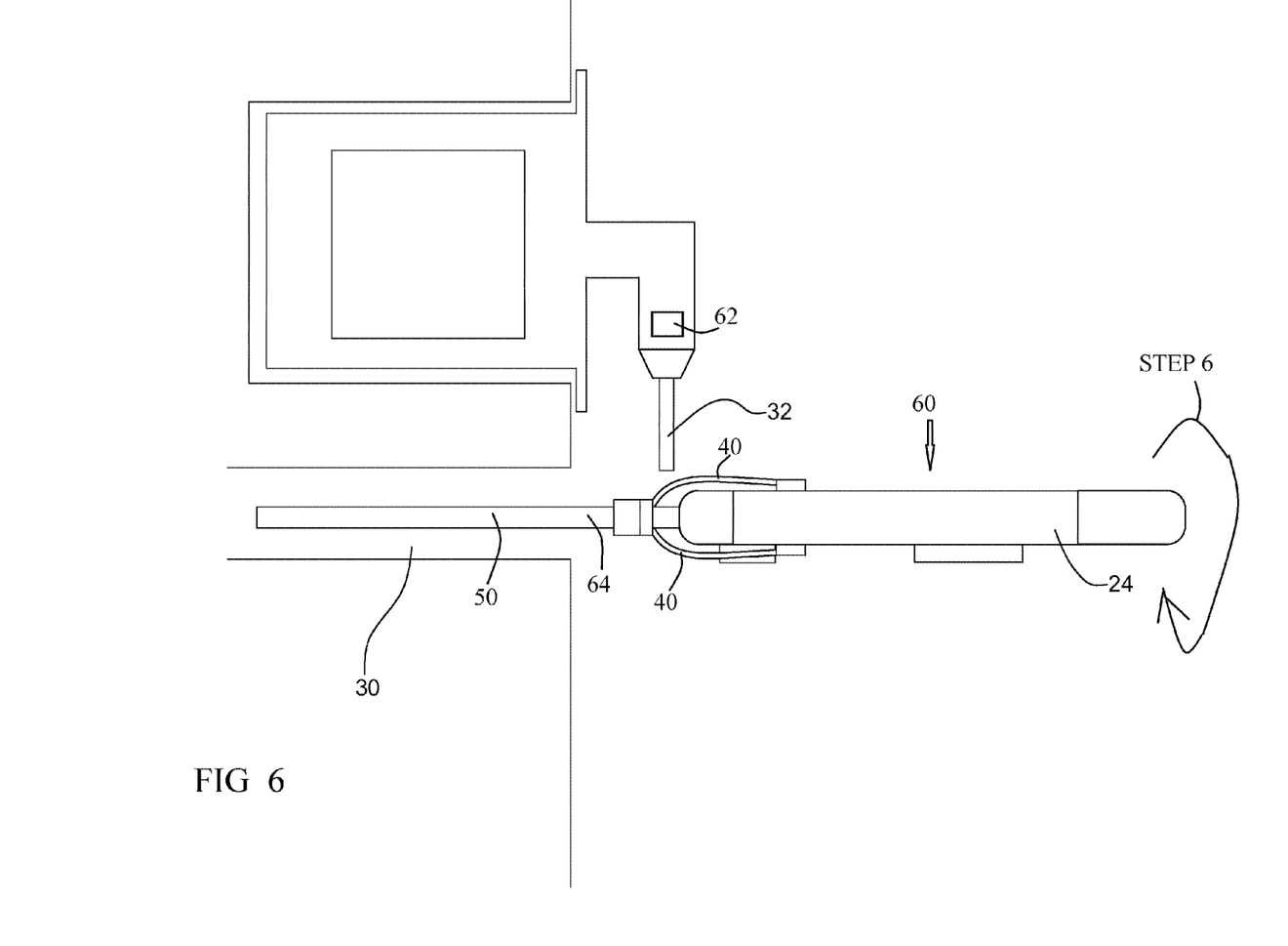
FIG. 6 depicts the apparatus of FIG. 3, at the sixth step.

FIG. 6 depicts the apparatus of FIG. 3, at the sixth step.

Figure 7:
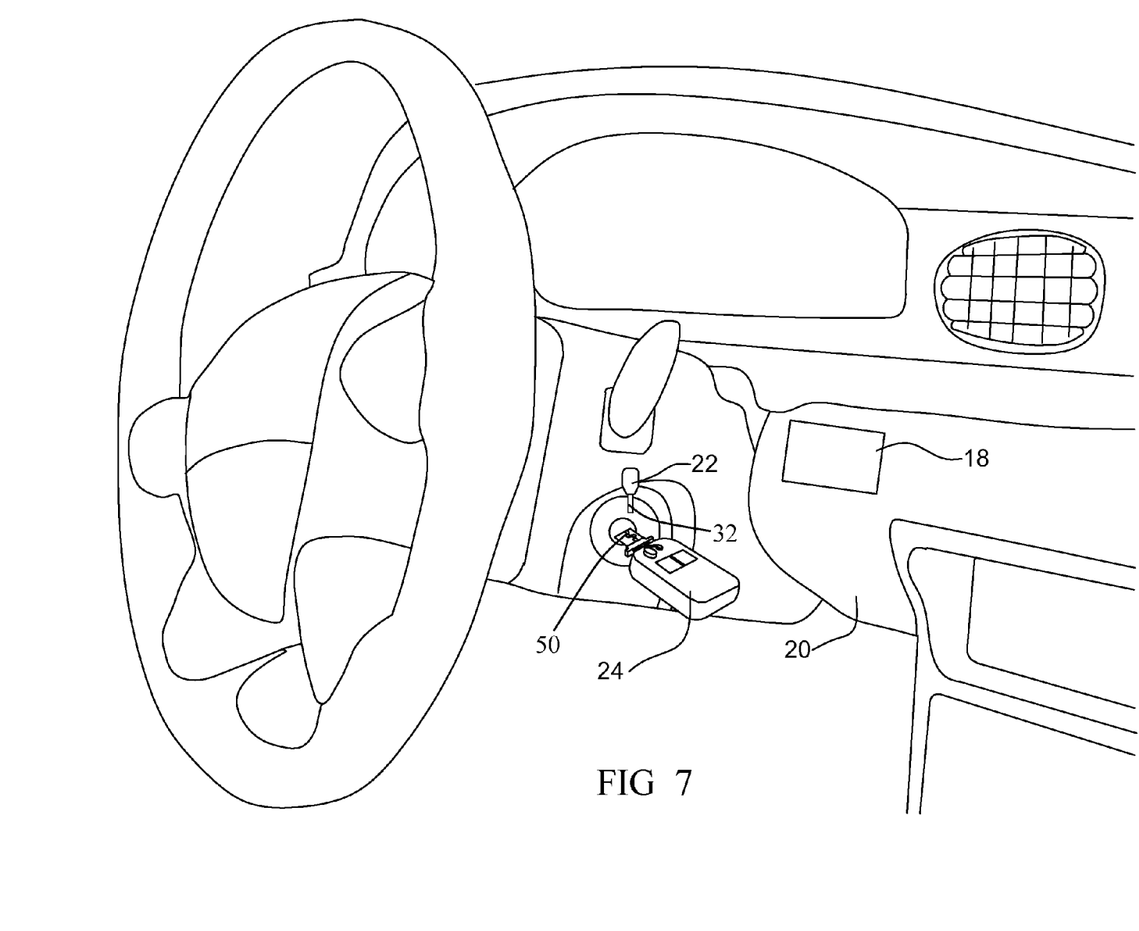
FIG. 7 is a perspective view of the apparatus of FIG. 3, at the state of FIG. 6.

FIG. 7 is a perspective view of the apparatus of FIG. 3, at the state of FIG. 6.

At the sixth step, the user rotates key 60 for igniting the vehicle.

It may be noted that at this state, since blade 50 is flat, bolt 32 allows removal of key 60. However, at this state, the vehicle's prior art lock 30 does not allow removal of key 60 (not shown).

Figure 8:
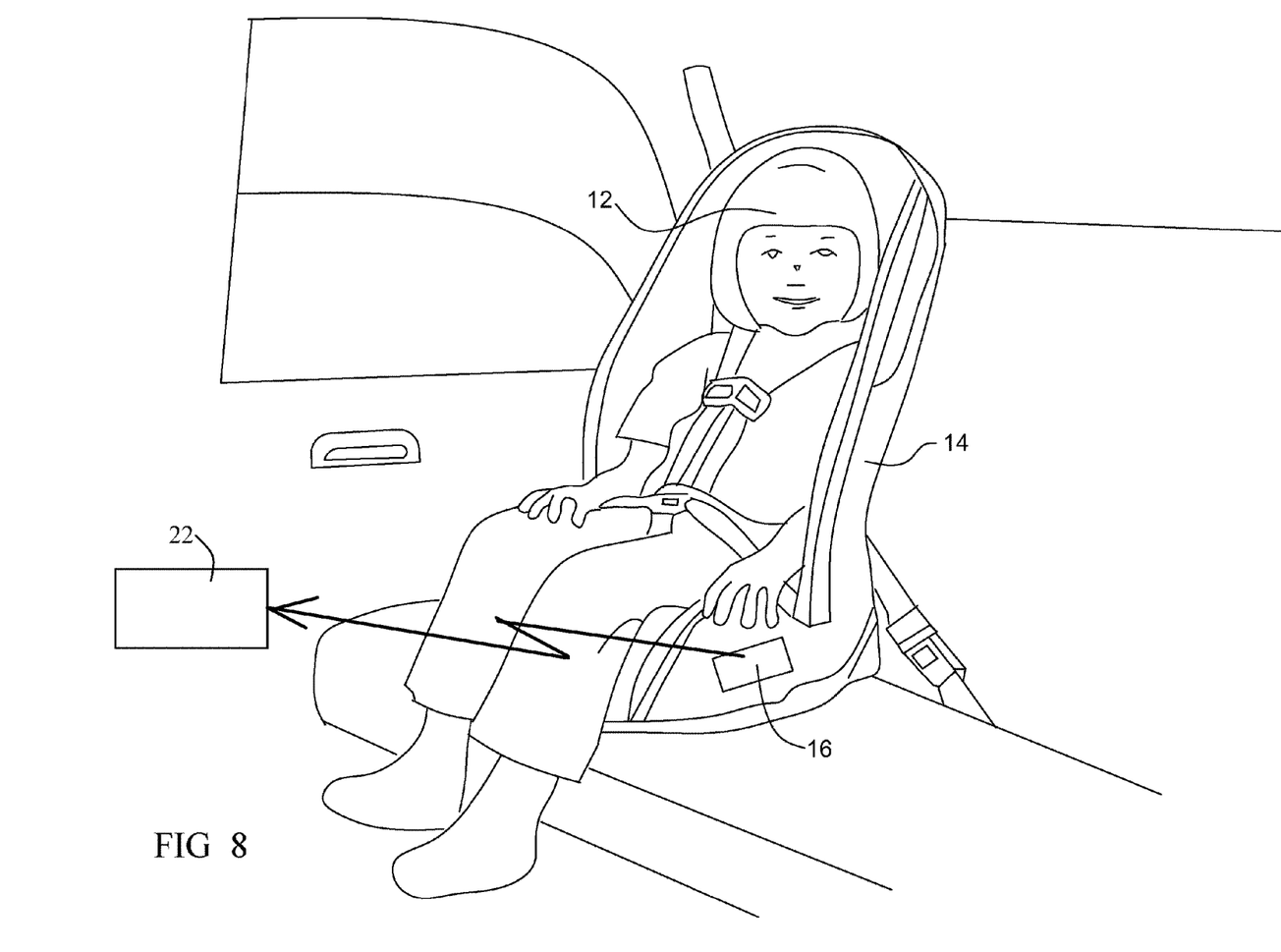
FIG. 8 is a perspective view of the control of the apparatus of FIG. 3.

FIG. 8 is a perspective view of the control of the apparatus of FIG. 3.

A control box 16 of an infant seat 14 controls bolt assembly 22, in that retracting of bolt 32 of FIG. 7 requires releasing of the infant 12 from infant seat 14.

Figure 9:
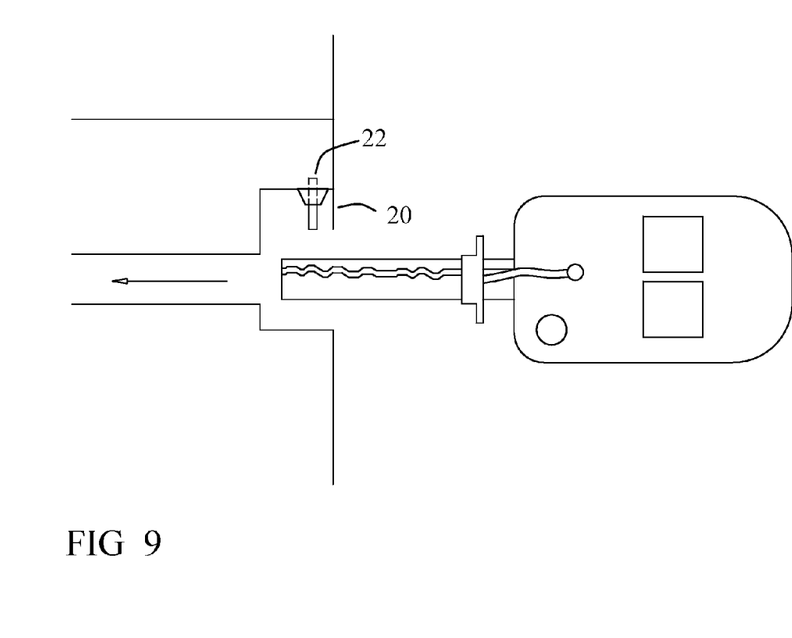
FIG. 9 is similar to FIG. 3, except that the bolt assembly is hidden.

FIG. 9 is similar to FIG. 3, except that the bolt assembly is hidden.

Figure 10:
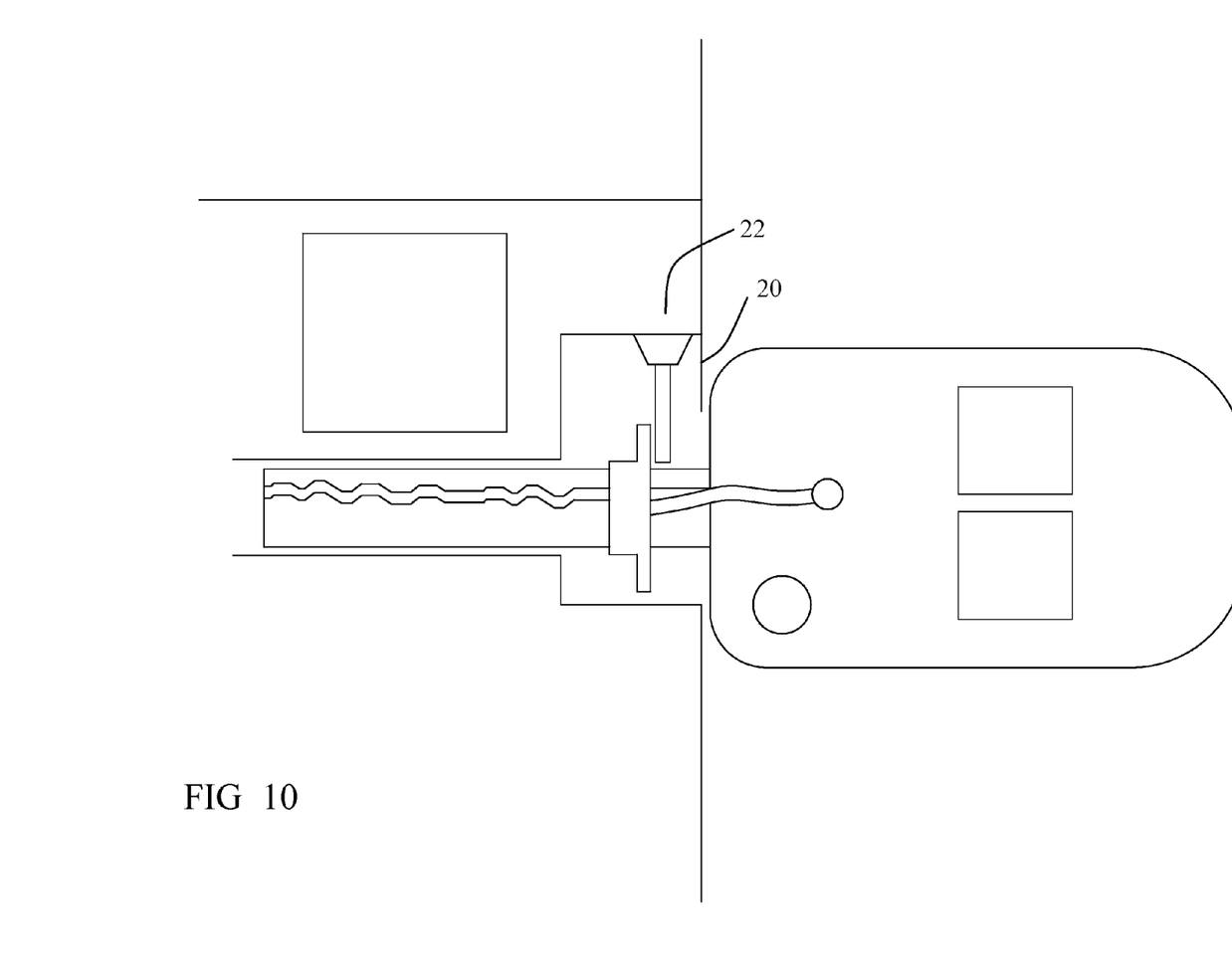
FIG. 10 is similar to FIG. 5, except that the bolt assembly is hidden.

FIG. 10 is similar to FIG. 5, except that the bolt assembly is hidden.

Figure 11:
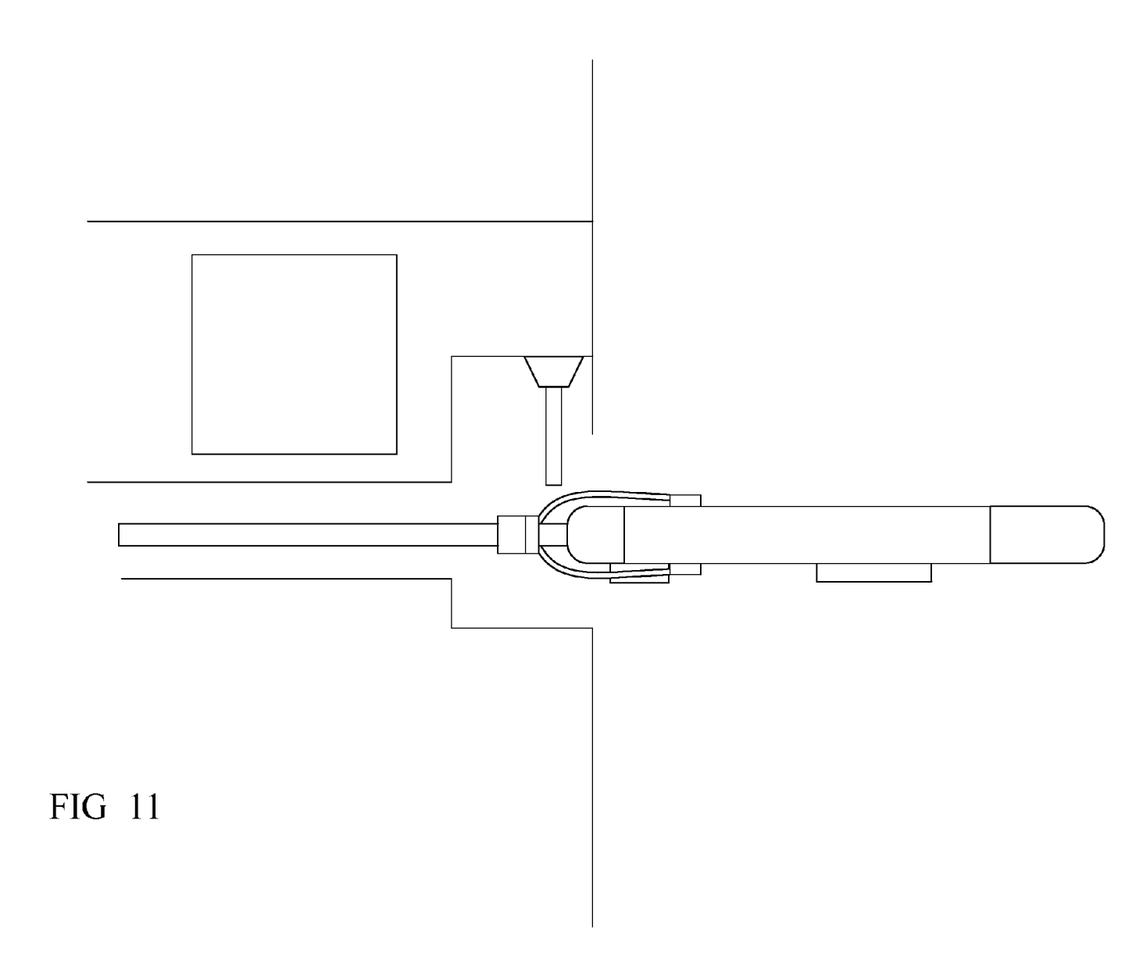
FIG. 11 is similar to FIG. 6, except that the bolt assembly is hidden.

FIG. 11 is similar to FIG. 6, except that the bolt assembly is hidden.

Figure 12:
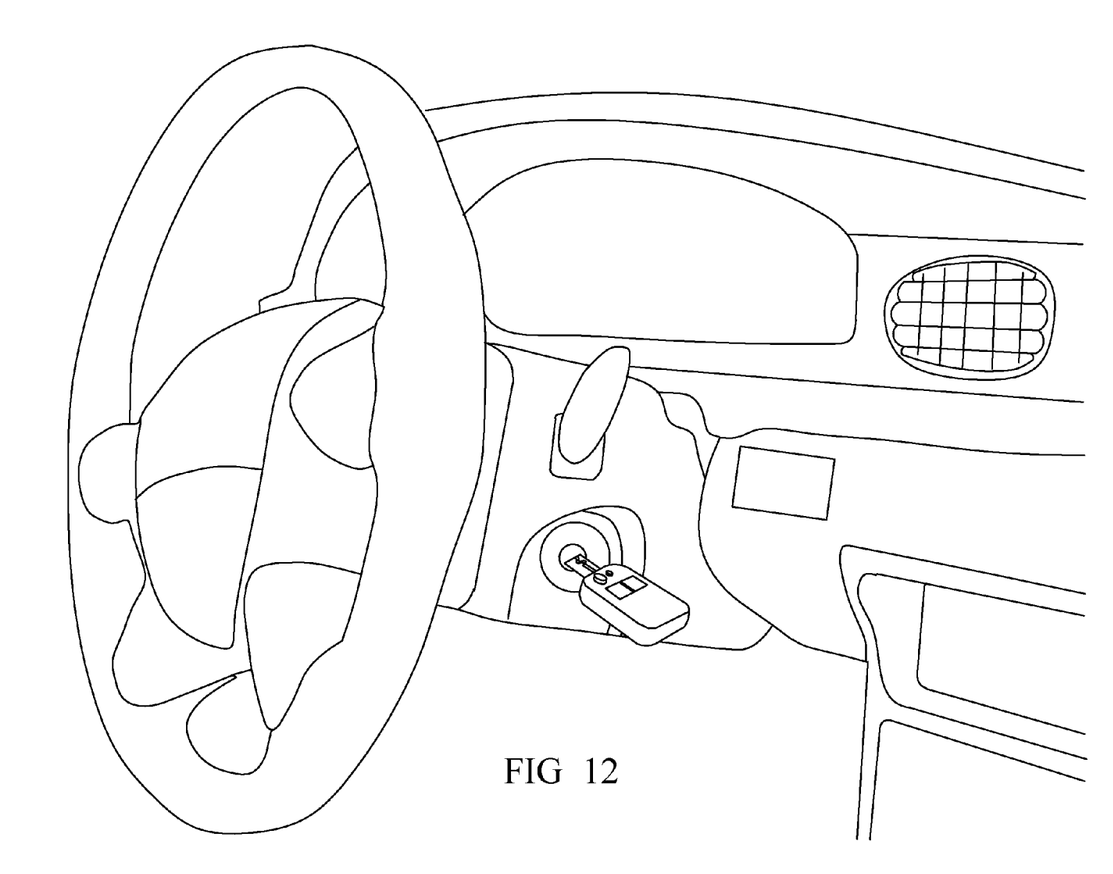
FIG. 12 is similar to FIG. 7, except that the bolt assembly is hidden.

FIG. 12 is similar to FIG. 7, except that the bolt assembly is hidden.

Bolt assembly 22 may be hidden behind dashboard 20.

Figure 13:
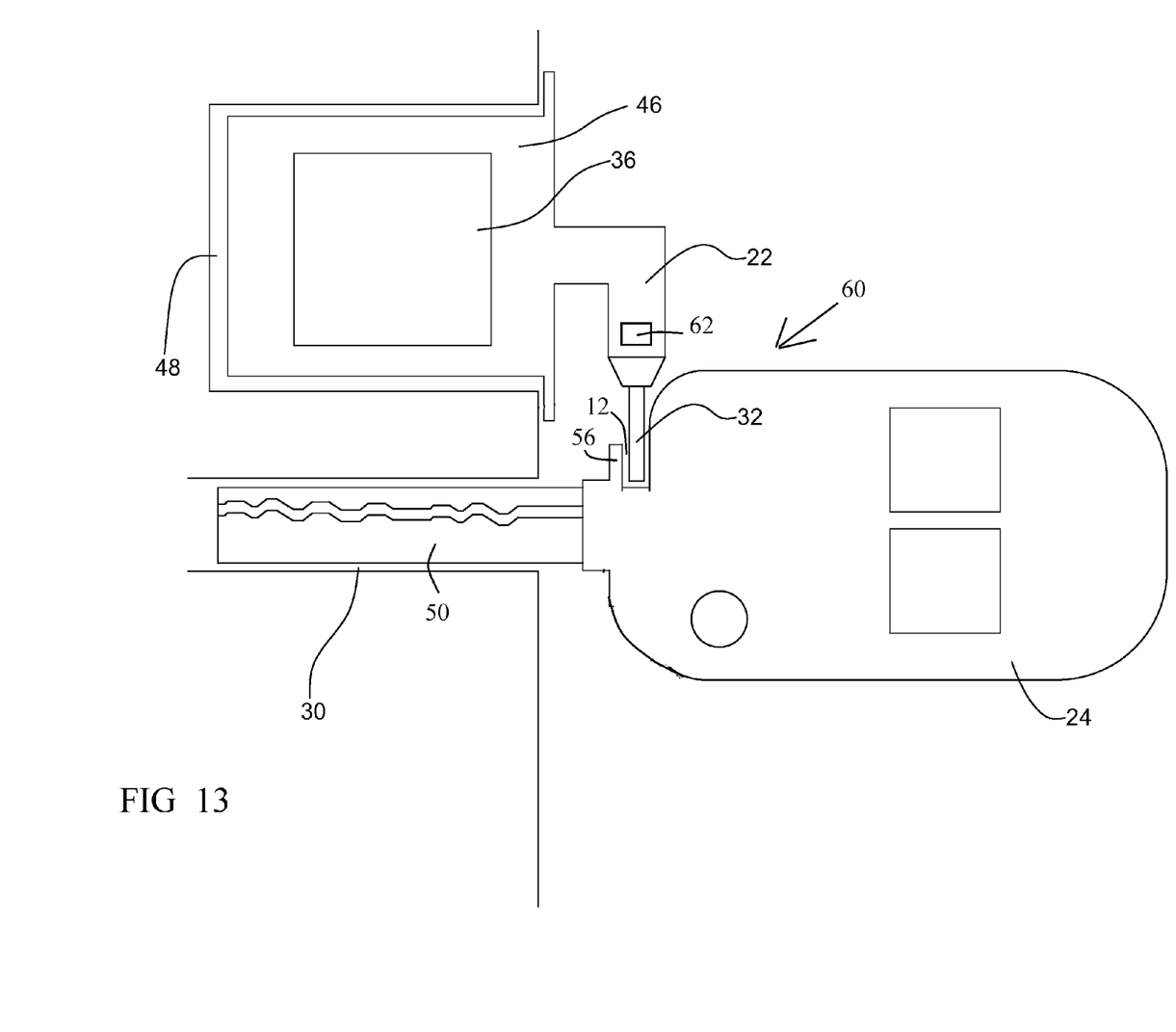
FIG. 13 is similar to FIG. 5, except that the handle, rather than the sleeve, includes the protrusion.

FIG. 13 is similar to FIG. 5, except that the handle, rather than the sleeve, includes the protrusion.

Figure 14:
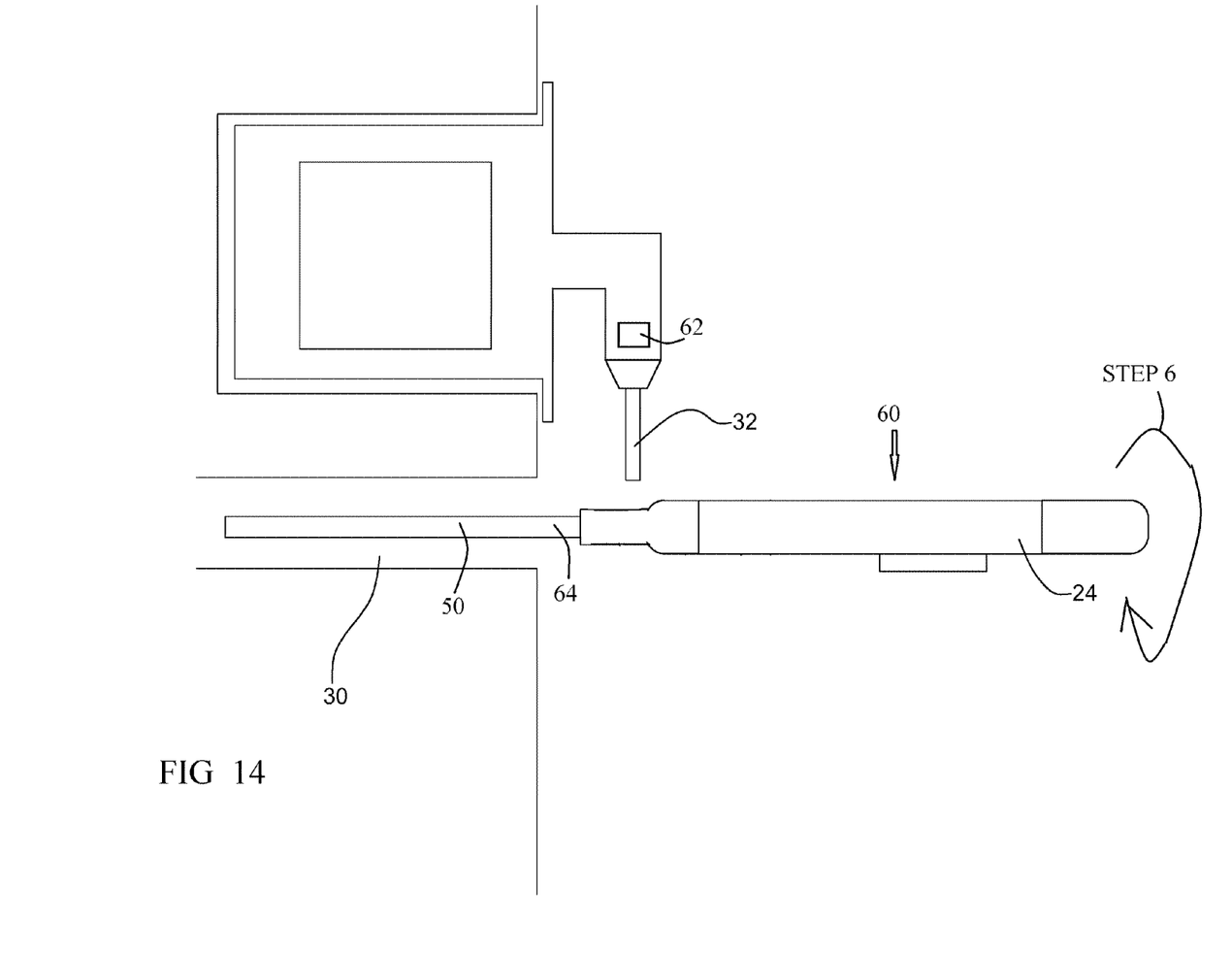
FIG. 14 is similar to FIG. 6, except that the handle, rather than the sleeve, includes the protrusion.

FIG. 14 is similar to FIG. 6, except that the handle, rather than the sleeve, includes the protrusion.

According to this embodiment, there is no sleeve worn on blade 50. Rather, protrusion 56 extends from handle 24, for forming gap 12.

Thus, in one aspect, the invention is directed to an apparatus (10) for avoiding abandoning an infant in a vehicle, the apparatus (10) including a mechanism (22), for providing a first state of avoiding removal of the key (60) from a vehicle's lock (30), and a second state of allowing removal of the key (60), and a control (16), for controlling the mechanism (22) to one of the states of the mechanism (32) as a function of presence of an infant (12) in the vehicle, thereby avoiding the key's removal as a function of the presence of the infant (12).

The mechanism (22) may constitute the integral mechanism of the vehicle's lock (30), i.e., mechanism (22) may be included he vehicle's lock.

The mechanism (22) may include a bolt assembly (22), including a slideable bolt (32), for allowing sliding thereof to be inserted into a gap (12) of the key (60), for avoiding removal of the key (60) from the vehicle's lock (30), and to another location, for allowing removal of the key (60).

The gap (12) may be formed by the blade (50) of the key (60).

The gap (12) may be formed by the end of the blade (50) of the key (60), being adjacent to the handle (24) of the key (60).

The gap (12) may be formed by the handle (24) of the key (60).

The gap (12) may be formed by a protrusion (56) protruding from the narrow side (64) of the blade (50) or the handle (24) of the key (60), thereby the slideable bolt (32) allows manual rotation of the blade (50).

The slideable bolt (32) preferably is slideable towards the narrow side (64) of the blade (50), thereby the slideable bolt (32) allows rotating the blade (50).

The protrusion (56) may be formed by a sleeve (26), for being worn on the blade (50).

The protrusion (56) may extend from the key's handle (24).

The avoiding of the removal of the key (60) from the vehicle's lock (30) preferably will be active only at the off rotational state of the key (60).

The bolt assembly (22) may be fixed to the dashboard (20) of the vehicle.

In the figures and/or description herein, the following reference numerals (Reference Signs List) have been mentioned:

numeral 10 denotes the key apparatus according to one embodiment of the invention;
numeral 12 denotes a gap, formed by the protrusion 56;
numeral 18 denotes a display;
numeral 20 denotes the dashboard;
numeral 22 denotes the bolt assembly;
numeral 24 denotes the key's handle;
numeral 26 denotes the sleeve;
numeral 28 denotes insertion of the key;
numeral 30 denotes the vehicle's lock, into which the key is inserted;
numeral 32 denotes the slideable bolt;
numeral 36 denotes the controller, for controlling the motor;
numeral 40 denotes a strip for limiting the distance of the sleeve from the handle;
numeral 42 denotes the fastening element of the strip;
numeral 44 denotes a fastening element being complementary to the fastening element of the strip;
numeral 46 denotes the packaging for fixing the bolt assembly to the dashboard;
numeral 48 denotes a space under the dashboard;
numeral 50 denotes the key's blade;
numeral 56 denotes the protrusion extending from the sleeve;
numeral 60 denotes the vehicle's key;
numeral 62 denotes the motor, for sliding the bolt;
numeral 64 denotes the narrow side of the key's blade;

The foregoing description and illustrations of the embodiments of the invention have been presented for the purpose of illustration, and are not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. An apparatus for avoiding abandoning an infant in a vehicle, said apparatus comprising:
   a mechanism, for providing a first state of avoiding removal of a key from a vehicle's lock, and a second state of allowing removal of said key; and
   a control, for controlling said mechanism to one of said states of said mechanism as a function of presence of an infant in said vehicle,
   thereby avoiding said key's removal as a function of said presence of said infant,
   wherein said mechanism comprises a bolt assembly, comprising a slideable bolt, for allowing motorizibly sliding thereof
      to be inserted into a gap of said key, for avoiding removal of said key from said vehicle's lock,
      and to another location, for allowing removal of said key, and
   wherein said gap is formed by a protrusion protruding from a blade of said key and being right angled and non-rotatable in relation to said blade, and comprising a sleeve, for being worn on said blade.

2. An apparatus according to claim 1, wherein said mechanism comprises an integral mechanism of said vehicle's lock.

3. An apparatus according to claim 1, wherein said gap is formed by a blade of said key.

4. An apparatus according to claim 1, wherein said gap is formed by an end of a blade of said key, being adjacent to a handle of said key.

5. An apparatus according to claim 1, wherein said gap is formed by a handle of said key.

6. An apparatus according to claim 1, wherein said gap is formed by a protrusion protruding from a narrow side of a blade or a handle of said key, thereby said slideable bolt allows manual rotation of said blade.

7. An apparatus according to claim 1, wherein said slideable bolt is slideable towards a narrow side of said blade, thereby said slideable bolt allows rotating said blade.

8. An apparatus according to claim 6, wherein said protrusion extends from said key's handle.

9. An apparatus according to claim 1, wherein said avoiding of said removal of said key from said vehicle's lock is active only at an off rotational state of said key.

10. An apparatus according to claim 1, wherein said bolt assembly is for being fixed to a dashboard of said vehicle.

* * * * *